United States Patent [19]

Ebskamp

[11] Patent Number: 5,093,144

[45] Date of Patent: Mar. 3, 1992

[54] LACTOPROTEIN-FREE LOW-CALORIC FAT SPREAD AND METHOD OF PREPARING

[75] Inventor: Hermanus J. G. Ebskamp, De Meern, Netherlands

[73] Assignee: Van Dijk Food Products (Lopik), Me Lopik, Netherlands

[21] Appl. No.: 467,666

[22] Filed: Jan. 19, 1990

[30] Foreign Application Priority Data

Jan. 23, 1989 [NL] Netherlands .................. 8900159

[51] Int. Cl.$^5$ .................. A23D 7/00; A23L 1/05
[52] U.S. Cl. .................. 426/603; 426/576; 426/578
[58] Field of Search ............... 426/576, 578, 603, 604, 426/602

[56] References Cited

U.S. PATENT DOCUMENTS

| | | | |
|---|---|---|---|
| 4,389,426 | 6/1983 | Reissmann et al. | 426/603 |
| 4,591,507 | 5/1986 | Bodor et al. | 426/604 |

FOREIGN PATENT DOCUMENTS

| | | |
|---|---|---|
| 498980 | 3/1979 | Australia . |
| 1074176 | 3/1980 | Canada . |
| 0233565 | 8/1987 | European Pat. Off. . |
| 0237120 | 9/1987 | European Pat. Off. . |
| 0256712 | 2/1988 | European Pat. Off. . |
| 2205849 | 12/1988 | United Kingdom . |

*Primary Examiner*—Donald E. Czaja
*Assistant Examiner*—Helen Pratt
*Attorney, Agent, or Firm*—Weintraub, DuRoss & Brady

[57] ABSTRACT

A lactoprotein-free fat spread with a fat content of 20-60% by weight, based on the total composition, of the water-in-oil type comprising a mixture of particles of vegetable fats being solid above 20° C. and particles of a liquid oil in such an amount that the total fat mixture contains at least 40% of polyunsatured fatty acids. The water phase contains 0.1 to 5% by weight of gelatin or agar-agar and 0.1 to 5% by weight of solubilized starch, particularly an amylopectin rich starch. More particularly wheat or maize starch is used. The spread presents a pH of 4.3 to 4.8, preferably 4.6. The spread is prepared by subjecting a water-in-oil emulsion containing all fat and oil as well as all in water dissolved other substances to a first cooling to above 20° C. with mechanical treatment, subjecting the mixture to a mechanical treatment without cooling thereby allowing a temperature rise of 2° to 8° C. and thereafter continuing the cooling with mechanical treatment to below 20° C.

7 Claims, No Drawings

LACTOPROTEIN-FREE LOW-CALORIC FAT SPREAD AND METHOD OF PREPARING

BACKGROUND OF THE INVENTION

1. The Field of the Invention

The invention relates to a fat spread with a fat content of 20 to 60% by weight, calculated relative to the entire composition, of the water-in-oil type comprising a mixture of particles of vegetable fats which are solid at least above 20° C. and particles of a liquid oil in an amount such that the total fat mixture contains at least 40% polyunsaturated fatty acids and the water phase contains a thickener in the form of 0.1 to 5% by weight gelatin or agar-agar.

2. The Prior Art

A fat spread of this type in which gelatin or agar-agar is used as thickener for the water phase is known.

In this known fat spread, where the water phase has a very substantial influence on the taste and structure, lactoprotein is used in the water phase in addition to a thickener in the form of gelatin or agar-agar.

In order to prevent the lactoprotein precipitating in the form of coarse particles during the preparation, the lactoprotein must be dissolved or dispersed in a separate aqueous medium and the mixing with a gelatin-containing solution must also be carried out at a temperature which is not higher than 40° C. Finally, it is compulsory to adapt the amount of gelatin or agar-agar to the hardness of the fat used.

Another disadvantage is that rapid growth of bacteria can occur as a consequence of the presence of lactoprotein and a relatively high pH of 5 to 6 of the product, as a result of which the spread has only a short shelf life.

SUMMARY OF THE INVENTION

The object of this invention is now to provide a fat spread of the type specified in the preceding first paragraph with which, surprisingly, a fat spread with an excellent taste is obtained without the use of lactoprotein and without the use of a complicated procedure and, moreover, with a much longer shelf life.

This feature is achieved according to the invention by a fat spread with a fat content of 20 to 60% by weight, calculated relative to the entire composition, of the water-in-oil type comprising a mixture of particles of vegetable fats which are solid at least above 20° C. and the particles of a liquid oil in an amount such that the total fat mixture contains at least 40% polyunsaturated fatty acids and in which the water phase contains a thickener in the form of 0.1 to 5% by weight gelatin or agar-agar, wherein the lactoprotein-free spread additionally contains 0.1 to 5% by weight of a solubilized starch, which may or may not be modified, in the water phase.

It has been found that the combination of 0.1 to 5% by weight of gelatin or agar-agar and 0.1 to 5% by weight of a solubilized starch in the water phase of a fat spread of this type leads to a particularly strong improvement in the taste and structure without having to resort to the use of lactoproteins. The structure and taste obtained with this combination is better than would be expected on the basis of the results obtained with each of these constituents on their own.

The absence of lactoprotein is also very important because, as already mentioned earlier, these proteins in general have an adverse effect on the shelf life of the fat spread as a result of the microbiological attack on such proteins at higher temperatures.

Particularly advantageously the solubilized starch is a starch rich in amylopectin since these types of starch give products with an optimum improvement in taste and an optimum structure of the water phase. Presumably, the particularly good gel-forming properties of the amylopectin present contribute to a very particular improvement of the taste of the fat spread in the mouth.

Appropriately the solubilized starch is a cereal starch, preferably a wheat starch or corn starch.

In particular when a cereal starch is used, in particular a wheat starch or a corn starch, a particularly good improvement in the viscosity of the water phase is obtained in the presence of gelatin or agar-agar. It is also possible to use modified types of starch and types of starch from root vegetables such as potatoes, cassava and the like.

In particular it is advisable that the water phase contains 0.1-2% by weight of a solubilized starch, which may or may not be modified, and 0.1-2% by weight of gelatin or agar-agar.

A solubilized starch means that the starch particles have swollen and form with the water a gel-like substance.

The pH of the fat spread according to the invention is below 5 and preferably between 4.3 and 4.8, in particular about 4.6.

According to an advantageous embodiment, the fat spread is obtained by subjecting an emulsion of water containing gelatin or agar-agar and solubilized starch in molten fat and oil to cooling to above 20° C. with mechanical treatment, then subjecting the mixture to a mechanical treatment without cooling, during which the temperature rises by at least 2° C. and by at most up to 1° C. below the melting point of the fat mixture, after which cooling is continued to below 20° C. and the fat spread is separated off.

The gelatin used is of a type such that the gel thereof has a low viscosity at 25° to 35° C.

Preferably the emulsion contains emulsifiers such as are used in known low-caloric fat spreads.

For the preparation of a fat spread according to the invention, the gelatin or agar-agar is dissolved in an aqueous medium at a temperature of 60°-100° C. and the starch is warmed in this mixture in water until it solubilizes. The solubilizing temperature for wheat starch is 68°-70° C. and for corn starch is 75°-85° C. The mixture containing gelatin or agar-agar and the solubilized starch is then mixed with a suitable fat phase which itself contains known emulsifiers.

The temperature of the mixture of water phase and fat phase is brought to 50° C., after which the mixture is cooled in a first Votator to a temperature of 22° C. The temperature of the mixture is then allowed to rise with mechanical treatment, without cooling, by 2° to 8° C., after which the mixture is then cooled to 11° C. in a second Votator.

In this way a fat spread is obtained which has an excellent taste in the mouth, while, moreover, the shelf life is very long.

DESCRIPTION OF THE PREFERRED EMBODIMENTS

EXAMPLE I

A water phase is prepared containing 2% by weight gelatin with a melting point of 30° C., 2% by weight of wheat starch (from American wheat), which is solubilized at a temperature of 72° C., 1.5% by weight of sodium chloride, 0.1% by weight of potassium sorbate, 0.13% by weight of citric acid and water. This water phase constitutes 60% by weight of the total mixture to be prepared.

A margarine fat which contains 60 parts of sunflower oil, 10 parts of partially solidified soya oil and 30 parts by weight of a re-esterified fat obtained from palm oil and coconut oil is added to the water phase.

The hardness value at 5° C. was 250 g/cm$^2$.

This low-fat spread was prepared as follows.

The constituents of the water phase were dissolved in half of the water at 80° C. and the mixture was kept at this temperature until the starch has solubilized.

The water phase was then emulsified with the fat mixture, the remaining part of the water added and the emulsion of the water-in-oil type thus obtained was passed through a first Votator with mechanical treatment and cooling to a temperature of 22° C., after which the temperature of the mixture was allowed to rise by 8° C. with mechanical treatment, without cooling, in an intermediate step in a crystallization apparatus, after which the mixture was then further cooled to 11° C. in a second Votator and finally packaged at 11° C. The pH of the spread was 4.6.

Notwithstanding the absence of lactoproteins in this fat spread, the spread possesses good characteristics with respect to the taste and the feel in the mouth.

The product had excellent spreadability at 8° C. and had a shelf life of at least four months.

EXAMPLE II

Example I is repeated except that 2% by weight of corn starch are used in place of wheat starch.

A product is obtained which has particularly good taste and structure characteristics as well as a shelf life of four months.

EXAMPLE III

The procedure of Example II was repeated replacing the 2% by weight of gelatin by 2% by weight of agar-agar with a melting point of 35° C.

A spread is obtained which has approximately the same characteristics as the spread obtained according to Example II.

What is claimed is:

1. An edible lactoprotein-free water-in-oil fat spread consisting of a water phase emulsified with a fat mixture, with a fat content of 20 to 60% by weight, calculated relative to the entire composition, the fat mixture consisting of a mixture of particles of vegetable fats which are substantially solid above 20° C. and droplets of a liquid oil in an amount such that the total fat mixture contains at least 40% polyunsaturated fatty acids; and in which the water phase consists essentially of:
   water;
   a first thickener in the form of 0.1 to 5% by weight of gelatin or agar-agar; and
   a second thickener in the form of 0.1 to 2% by weight of solubilized starch in the water phase;
   wherein the starch is solubilized to such an extent that it forms a gel-like substance with the water phase.

2. A fat spread according to claim 1, wherein the solubilized starch comprises amylopectin.

3. A fat spread according to claim 1, wherein the solubilized starch is a cereal starch.

4. A fat spread according to claim 1, wherein the solubilized starch is chosen from a selected from the group consisting of wheat starch, corn starch and mixtures thereof.

5. A fat spread according to claim 1, wherein the pH of the fat spread is below 5.

6. A fat spread according to claim 1, wherein the pH of the fat spread is between 4.3 and 4.8.

7. The fat spread of claim 1, wherein the pH of the fat spread is 4.6.

* * * * *